United States Patent
Tabata et al.

(10) Patent No.: US 9,533,580 B2
(45) Date of Patent: Jan. 3, 2017

(54) POWER CONVERTER FOR VEHICLE GENERATOR-MOTOR AND METHOD FOR CONTROLLING VEHICLE GENERATOR-MOTOR

(75) Inventors: Mitsunori Tabata, Chiyoda-ku (JP);
Masato Mori, Chiyoda-ku (JP);
Kenichi Akita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 132 days.

(21) Appl. No.: 14/371,008

(22) PCT Filed: Mar. 7, 2012

(86) PCT No.: PCT/JP2012/055797
§ 371 (c)(1),
(2), (4) Date: Jul. 8, 2014

(87) PCT Pub. No.: WO2013/132606
PCT Pub. Date: Sep. 12, 2013

(65) Prior Publication Data
US 2015/0019059 A1    Jan. 15, 2015

(51) Int. Cl.
*B60L 7/18* (2006.01)
*H02P 9/14* (2006.01)
(Continued)

(52) U.S. Cl.
CPC .. *B60L 7/18* (2013.01); *B60L 7/14* (2013.01);
*B60L 7/16* (2013.01); *B60L 11/1803* (2013.01);
(Continued)

(58) Field of Classification Search
CPC ............ H02P 9/14; H02P 9/48; B60L 7/14; B60L 7/18; B60L 11/1803; B60L 7/16
(Continued)

(56) References Cited

U.S. PATENT DOCUMENTS

| 2007/0132409 A1* | 6/2007 | Wada | H02P 6/142 318/146 |
| 2009/0125176 A1* | 5/2009 | Louise | H02P 9/02 701/34.4 |

(Continued)

FOREIGN PATENT DOCUMENTS

| EP | 1283595 A2 | 2/2003 |
| JP | 2003-061398 A | 2/2003 |

(Continued)

OTHER PUBLICATIONS

Communication dated Jul. 5, 2016, from the European Patent Office in counterpart European Application No. 12870716.3.

*Primary Examiner* — Viet Nguyen
(74) *Attorney, Agent, or Firm* — Sughrue Mion, PLLC

(57) ABSTRACT

Provided are a power converter for a vehicle generator-motor and a method for controlling a vehicle generator-motor, which is used for a field winding type vehicle generator-motor configured to perform control in accordance with an external operating command in which a power converter is connected to a rotating electrical machine including a field winding and an armature winding. When the generator-motor shifts from a driving state to another operating mode, a method of stopping a driving mode is switched in accordance with an operating mode to be shifted, to thereby shift the operating mode promptly without generating an unintended power generation, an excess power generation, and an excess torque fluctuation.

17 Claims, 8 Drawing Sheets

(51) Int. Cl.
*H02P 9/48* (2006.01)
*B60L 7/14* (2006.01)
*B60L 7/16* (2006.01)
*B60L 11/18* (2006.01)
*H02P 101/45* (2015.01)

(52) U.S. Cl.
CPC . *H02P 9/14* (2013.01); *H02P 9/48* (2013.01); *H02P 2101/45* (2015.01)

(58) Field of Classification Search
USPC .......................................................... 322/59
See application file for complete search history.

(56) References Cited

U.S. PATENT DOCUMENTS

| | | | |
|---|---|---|---|
| 2010/0087974 A1* | 4/2010 | Nakajima | B60L 7/003 701/22 |
| 2012/0261916 A1* | 10/2012 | Tabata | F02N 11/04 290/31 |
| 2014/0292240 A1* | 10/2014 | Tabata | H02P 9/48 318/400.15 |
| 2015/0048773 A1* | 2/2015 | Akita | H02P 9/30 318/717 |
| 2015/0091534 A1* | 4/2015 | Akita | H02P 29/0072 322/59 |

FOREIGN PATENT DOCUMENTS

| | | |
|---|---|---|
| JP | 2006-034027 A | 2/2006 |
| JP | 2007174766 A | 7/2007 |
| JP | 4185094 B2 | 11/2008 |
| JP | 2010-081709 A | 4/2010 |
| JP | 2010-081741 A | 4/2010 |
| JP | 2010110098 A | 5/2010 |
| JP | 4570982 B2 | 10/2010 |

* cited by examiner

POWER CONVERTER FOR VEHICLE GENERATOR-MOTOR AND METHOD FOR CONTROLLING VEHICLE GENERATOR-MOTOR

CROSS REFERENCE TO RELATED APPLICATIONS

This application is a National Stage of International Application No. PCT/JP2012/055797, filed Mar. 7, 2012, the contents of all of which are incorporated herein by reference in their entirety.

TECHNICAL FIELD

The present invention relates to a power converter for a vehicle generator-motor and a method for controlling a vehicle generator-motor, the vehicle generator-motor being a field winding generator-motor including an armature winding and a field winding, which is mountable mainly on a vehicle and which operates as a motor at the time of starting an engine and assisting torque and operates also as a generator after the start.

BACKGROUND ART

In recent years, for the purpose of fuel efficiency improvement and conformity to environmental standards, development has been made on a vehicle that has a generator-motor mounted thereon to perform a so-called idle stop for stopping an engine at the time of stopping the vehicle and restarting the engine at the time of moving the vehicle. Such vehicle generator-motor is required to be compact, low in cost, and high in torque, and hence a field winding generator-motor is often used.

In general, in the field winding generator-motor, the inductance of a field winding is larger than the inductance of an armature winding. Thus, if energization to the armature winding and energization to the field winding are simultaneously stopped in order to stop the driving, because the reduction rate of the field current is slower than that of the armature current, an induced voltage may be generated by a residual field magnetic flux to cause an unintended power generating state. In such case, excess generated electric power may adversely affect a battery or other devices, or excess braking torque may be output to adversely affect engine control as well.

To deal with this, in Patent Literature 1, the following method is proposed. After an instruction to stop driving is given, processing of reducing a field current is performed while an armature is continued to be energized. Then, after the field current decreases to a certain level, the energization to the armature is stopped to prevent power generation.

In Patent Literature 1, this field current level is determined based on an rpm of the generator-motor and a voltage between input terminals (hereinafter referred to as "B-terminal voltage") or a battery voltage so as to have a value in a range where an induced voltage may fall below the B-terminal voltage or the battery voltage.

CITATION LIST

Patent Literature

[PTL 1] JP 4185094 B
[PTL 2] JP 4570982 B
[PTL 3] JP 2010-81709 A

SUMMARY OF INVENTION

Technical Problems

However, if the control as disclosed in Patent Literature 1 is uniformly performed, for example, when electric power is intended to be generated immediately in order to suppress engine pick-up after the driving for starting the engine is finished, torque may be output in the driving direction until the field current is gradually reduced or until the stop control is completed even though the torque is intended to be output in the braking direction.

In addition, in this case, even though electric power is intended to be generated, the energization to the armature side is continued, and hence electric power on the armature side is wastefully consumed during this period.

As described above, the method disclosed in Patent Literature 1 has a problem in that the operating mode cannot be promptly shifted to the next mode after the driving is stopped.

In Patent Literature 2, there is proposed a method in which field current rapid attenuation portion is provided and is activated when the operating mode is shifted from a driving mode to a power generating mode, to thereby prevent power generation. However, there is a problem in that an additional cost is necessary for mounting the field current rapid attenuation portion.

Solution to Problems

It is an object of the present invention to provide a power converter for a vehicle generator-motor and the like, which are capable of preventing an unintended power generation or an excessive power generation torque caused by a residual field magnetic flux at the time of stopping driving, thereby shifting to the next operating mode promptly without adding any component or any circuit.

According to one embodiment of the present invention, there are provided a power converter for a vehicle generator-motor and a method for controlling a vehicle generator-motor, which is used for a field winding type vehicle generator-motor configured to perform control in accordance with an external operating command in which a power converter is connected to a rotating electrical machine including a field winding and an armature winding. When the generator-motor shifts from a driving state to another operating mode, a method of stopping a driving mode is switched in accordance with an operating mode to be shifted, to thereby shift the operating mode promptly without generating an unintended power generation, an excess power generation, and an excess torque fluctuation.

Advantageous Effects of Invention

According to one embodiment of the present invention, it is possible to prevent an unintended power generation or an excessive power generation torque caused by a residual field magnetic flux at the time of stopping driving, thereby shifting to the next operating mode promptly without adding any component or any circuit.

DESCRIPTION OF EMBODIMENTS

Figure 1:
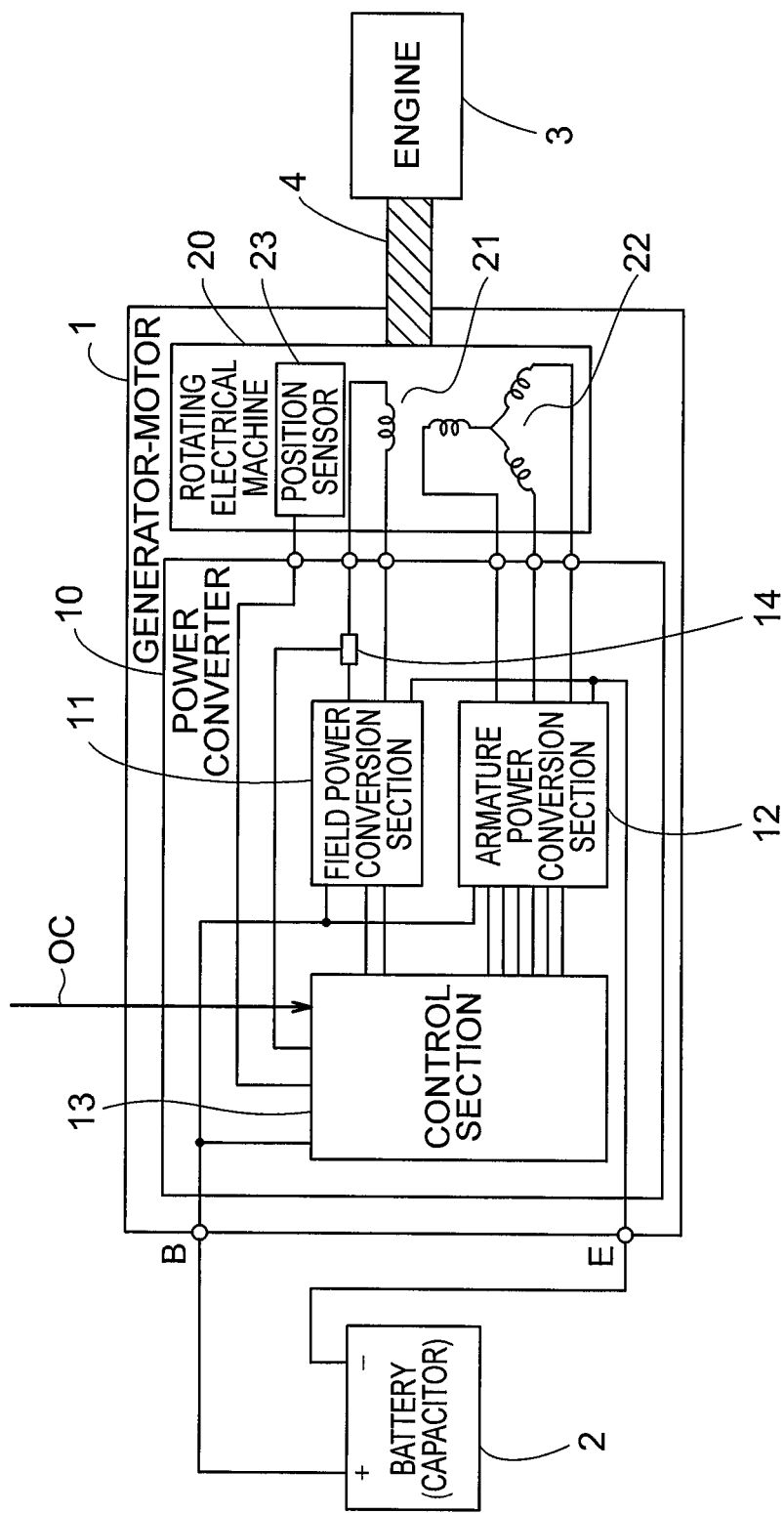
FIG. 1 is a schematic configuration diagram of a vehicle system equipped with a power converter for a vehicle generator-motor according to the present invention.

The present invention includes a plurality of driving stop portion and is configured to switch, depending on a mode to be shifted next, the driving stop portion to be used.

Further, the present invention is configured to determine, depending on the mode to be shifted next, a field current level for starting the driving stop portion after the field current reduction processing is performed.

Now, a power converter for a vehicle generator-motor and the like according to the present invention are described by way of embodiments with reference to the drawings. Like reference numerals and symbols denote like or corresponding parts in the embodiments, and overlapping descriptions are omitted.

First Embodiment

FIG. 1 is a schematic configuration diagram of a vehicle system equipped with the power converter for a vehicle generator-motor according to the present invention. Referring to FIG. 1, a rotating electrical machine 20 of a generator-motor 1 is connected to an engine 3 via a power transmission part 4 such as a belt.

In response to an operating command (OC) including an operating mode and a torque command from a controller of an external idle stop system or a key switch (both not shown), the generator-motor performs an operation in accordance with the command.

For example, when the engine 3 is to be started, the generator-motor 1 operates as a motor (driving mode) to rotate the engine. During the operation of the engine, the generator-motor 1 operates as a generator (power generating mode) to supply generated electric power to a battery (or a capacitor; hereinafter referred to as "battery") 2 serving as a rechargeable power supply. The power generating mode controls a generated voltage to be constant or controls a generated current to generate an instructed torque. Even during the operation of the engine 3, the generator-motor 1 may operate as a motor to assist torque if necessary. In addition, the generator-motor 1 has a mode of generating braking torque by consuming generated electric power inside the generator-motor 1 (braking mode), a standby mode without performing any operation (stop mode), and other such modes.

The generator-motor 1 includes a power converter 10 and the rotating electrical machine 20. The power converter 10 includes a field power conversion section 11, an armature power conversion section 12, a control section 13 for issuing an ON/OFF command for a power conversion element to each of the power conversion sections 11 and 12, and a current sensor 14 for detecting a field current. The rotating electrical machine 20 includes a field winding 21 for generating a field magnetic flux when supplied with a field current, an armature winding 22, and a position sensor 23 necessary for acquiring an rpm and the like of the rotating electrical machine 20.

In general, a half bridge circuit formed of MOSFETs as power conversion elements is used for the field power conversion section 11 of the generator-motor 1. The field power conversion section 11 operates in response to the ON/OFF command for the power conversion element issued from the control section 13, and supplies a field current to the field winding 21 under PWM control. In general, a three-phase bridge circuit formed of MOSFETs as power conversion elements is used for the armature power conversion section 12. In driving (driving mode), the armature power conversion section 12 operates in response to the ON/OFF command for the power conversion element issued from the control section 13, and supplies an armature current to the armature winding 22. In power generation (power generating mode), the armature power conversion section 12 rectifies the armature current from the armature winding 22 to supply electric power to the battery 2 and other loads. In braking (braking mode), the power conversion elements on one arm of the three-phase bridge circuit are all turned ON (referred to as "three-phase short-circuit braking"), to thereby consume the generated electric power inside the generator-motor 1. In stopping (stop mode), the power conversion elements are all turned OFF. Note that, when the operating mode shifts from the driving mode to the next mode other than the driving mode, the power conversion elements are all turned OFF finally through control to be described later, to thereby shift the operating mode to the next mode. Note that, the circuit configurations themselves of those bridge circuits are well-known art, and hence a further detailed description is omitted. Terminals B and E of the power converter 10 or the generator-motor 1 connected to the battery (capacitor) 2 are referred to as "input/output terminals for electric power".

Figure 8:
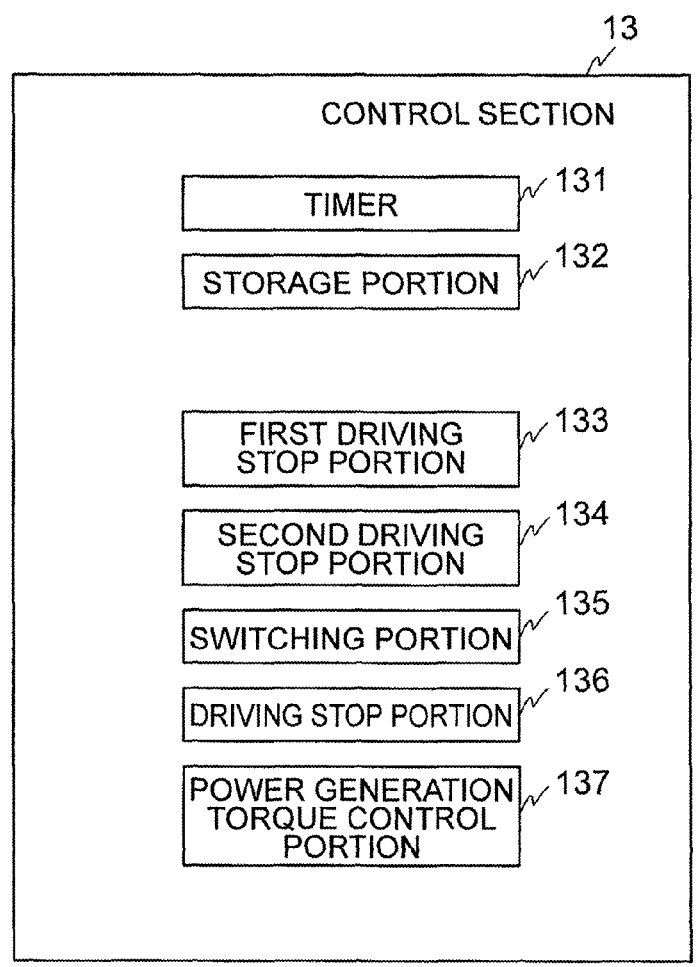
FIG. 8 is a functional block diagram of a control section of the power converter for a vehicle generator-motor according to the present invention.

The control section 13 is constructed by a computer including a storage section. FIG. 8 illustrates an exemplary functional block diagram of the control section 13. In FIG. 8, the configurations relating to all the embodiments are collectively illustrated. The control section 13 includes a timer 131, storage portion 132, first driving stop portion 133, second driving stop portion 134, switching portion 135, driving stop portion 136, and power generation torque control portion 137.

Figure 2:
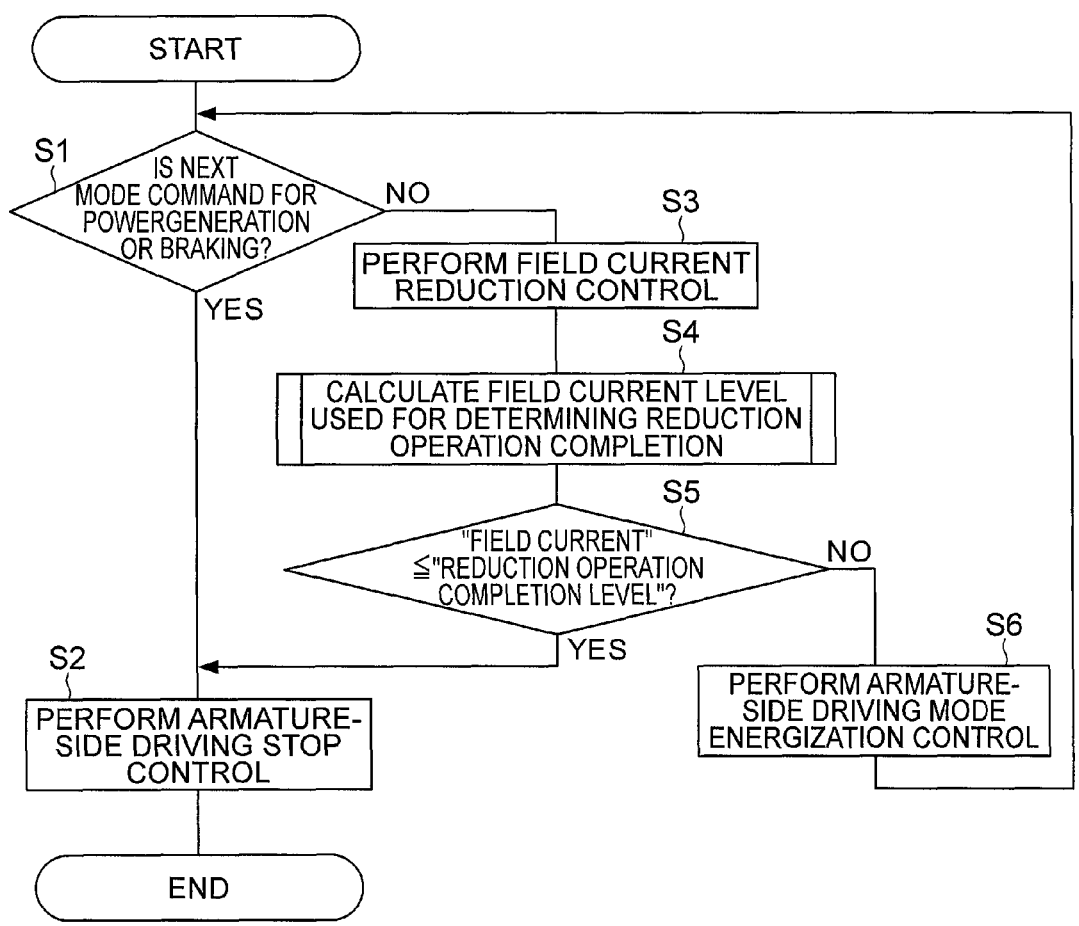
FIG. 2 is a flowchart illustrating an operation of the power converter at the time of finishing a driving mode according to a first embodiment of the present invention.

Referring to FIG. 2, an operation of the power converter 10 under the control of the control section 13 is subsequently described. FIG. 2 is a flowchart illustrating an operation of the power converter under the control of the control section 13 at the time of finishing the driving mode. First, in Step S1, it is determined whether or not the next operating mode command is for the power generating mode or the braking mode. When the next mode command is for the power generating mode or the braking mode, the flow proceeds to Step S2. Otherwise, that is, when the next mode command is for a mode other than the power generating mode and the braking mode, for example, the stop mode, the flow proceeds to Step S3.

In Step S2, a driving operation on the armature (22) side is stopped and finished to shift the operating mode to the power generating mode or the braking mode. Specifically, when the next operating mode command is for the power generating mode, field current reduction processing by the field power conversion section 11 is not performed, but the field power conversion section 11 and the armature power conversion section 12 are controlled to immediately finish the driving mode so that the operating mode shifts to the power generating mode. Similarly, when the operating mode command is for the braking mode, the field current reduction processing by the field power conversion section 11 is not performed, but the field power conversion section 11 and the armature power conversion section 12 are controlled to immediately finish the driving mode so that the operating mode shifts to the braking mode.

In Step S3, on the other hand, the armature power conversion section 12 is controlled to continue the energization to the armature, but the control of the field power conversion section 11 is stopped to stop the energization to the field winding 21, to thereby reduce the field current (reduction operation). After that, in Step S4, a field current level used for determining reduction operation completion is calculated. This field current level, for example, as disclosed in the invention of Patent Literature 1, is determined based on an rpm of the generator-motor 1 and a B-terminal voltage (input/output terminal voltage denoted by reference symbol B of FIG. 1) or a battery voltage (standardized battery voltage: such as 12 V, 24 V, and 36 V) so as to have a value in the range where an induced voltage may fall below the B-terminal voltage or the battery voltage. The control section 13 used for this control is connected also to the input/output terminal B in order to obtain the B-terminal voltage. A standardized voltage of the battery in use is stored in the storage portion 132 of the control section 13. As described later, the above-mentioned field current level determined for each rpm of the generator-motor 1 and each B-terminal voltage or battery voltage may be stored in the storage portion 132 in advance in the form of a table or a formula as information used for determining reduction operation completion (field current level information).

In this case, the control section 13 determines the rpm of the generator-motor 1 based on a temporal change in position supplied from the position sensor 23 that detects a rotation position of the rotating electrical machine 20, and acquires the field current from the current sensor 14. Then, the induced voltage, rpm, and field current of the rotating electrical machine 20 roughly have the following relationship.

$$(\text{induced voltage}) = (\text{coefficient}) \times (\text{rpm}) \times (\text{field current})$$

$$(\text{field current}) = (\text{induced voltage}) / \{(\text{coefficient}) \times (\text{rpm})\}$$

After the field current level used for determining reduction operation completion is determined, it is determined in Step S5 whether or not the value of the field current is equal to or smaller than the field current level used for determining reduction operation completion (predetermined threshold). When the value of the field current is equal to or smaller than the field current level used for determining reduction operation completion, an unintended power generation due to the induced voltage can be prevented even if the control of the armature power conversion section 12 is stopped to stop the energization to the armature side at this timing. Accordingly, the flow proceeds to Step S2 to stop the driving operation on the armature side, to thereby finish the driving operation.

On the other hand, when the value of the field current exceeds the field current level used for determining reduction operation completion in Step S5, the flow proceeds to Step S6. If the driving operation on the armature side is stopped at this time point, electric power may be generated even with no power generation instruction. To deal with this, in Step S6, armature energization control in the driving mode is continued. After that, the flow proceeds to Step S1, and a series of the flow (Steps S5→S6→S1→S3→S4→S5) is repeated. The driving is stopped after the field current decreases to be equal to or smaller than the field current level used for determining reduction operation completion.

Note that, Step S1 serves as the switching portion 135, Step S2 serves as the first driving stop portion 133, and Steps S1 to S6 serve as the second driving stop portion 134.

In this embodiment, only in the case of the shift from the driving mode to the power generating mode or the shift from the driving mode to the braking mode, the driving is immediately stopped without waiting for a fall of the field, to thereby shift the operating mode to power generation mode or braking mode. In the case of the shift from the driving mode to another operating mode, the driving is stopped after the field current decreases to be equal to or smaller than a given value, to thereby shift the operating mode to the next operating mode. The driving mode is essential, but it is enough that any one of the power generating mode and the braking mode is provided. In particular, the braking mode may be omitted.

As described above, according to this embodiment, in the case of finishing the driving, when the next mode command is for the power generating mode or the braking mode, the operating mode is shifted to the power generating mode or the braking mode without waiting for the reduction in field current, but otherwise, the driving is finished after the reduction processing is performed in order to prevent an unintended power generation due to a residual field current. Consequently, a power generating operation or a braking operation can be performed promptly when the next operating mode command is for the power generating mode or the braking mode, and an unintended power generation can be prevented when the next operating mode command is for another mode such as the stop mode.

Note that, in this embodiment, when the next mode is a mode other than the power generating mode and the braking mode, the field current level (threshold) is used for a determination as to whether or not to stop the driving. Alternatively, however, the determination may be performed by using a predetermined elapsed period in each mode corresponding to the period necessary for the field current to reach the above-mentioned field current level since the field current reduction control was started (that is, since the next mode command was received) (the driving is stopped after a predetermined period has elapsed). In this case, the elapsed period is counted by the timer 131, for example. Also in this case, the elapsed period determined for each operating mode to be shifted, each rpm of the generator-motor 1, and each B-terminal voltage or battery voltage may be stored in the storage portion 132 in advance in the form of a formula or a table as information used for determining reduction operation completion (elapsed period information), which may be used for the determination.

Second Embodiment

Figure 3:
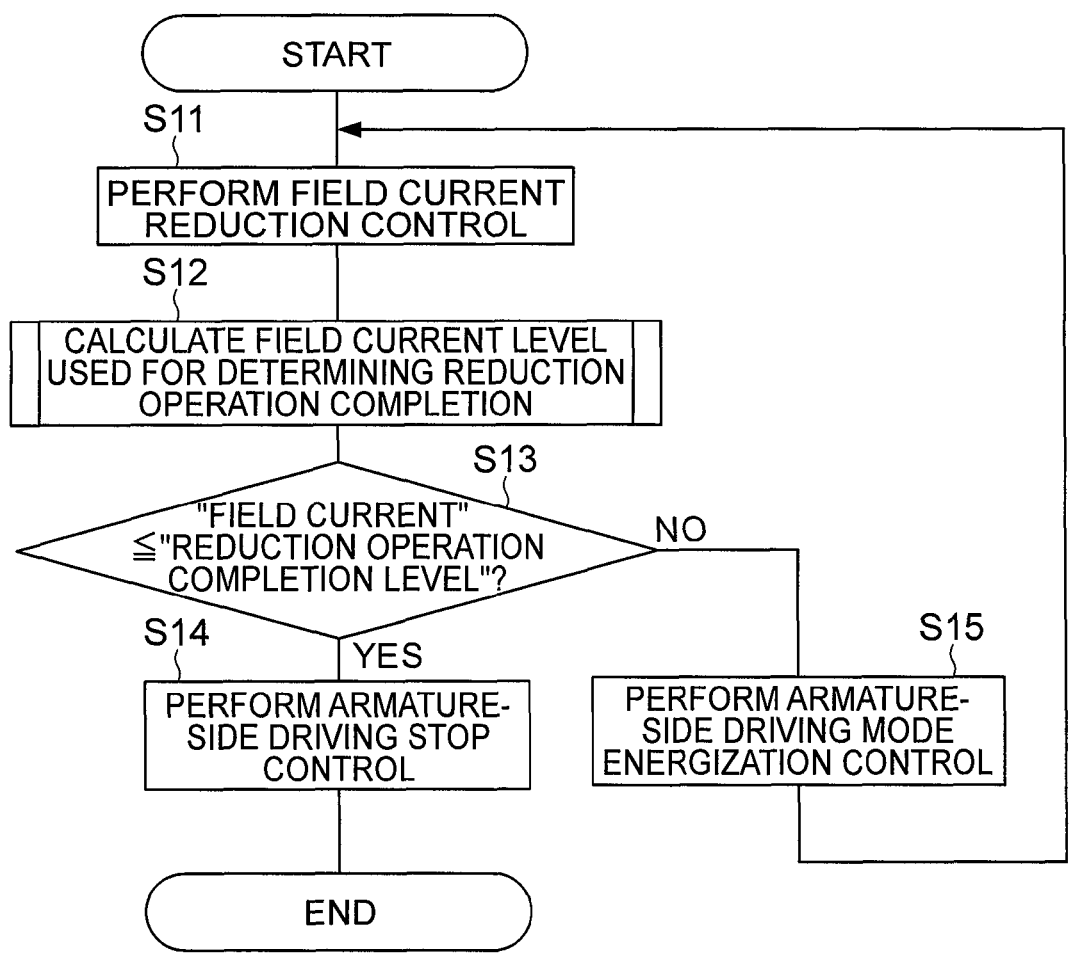
FIG. 3 is a flowchart illustrating an operation of the power converter at the time of finishing the driving mode according to a second embodiment of the present invention.

Next, a power converter for a vehicle generator-motor according to a second embodiment of the present invention is described. FIG. 3 is a flowchart illustrating an operation of the power converter under the control of the control section 13 at the time of finishing the driving mode according to the second embodiment of the present invention. Other operations of the power converter than the operation of finishing the driving mode are the same as those in the first embodiment, and hence descriptions thereof are omitted.

First, in Step S11, field current reduction processing (reduction operation) is started. This reduction processing is the same as that in the first embodiment.

Figure 4:
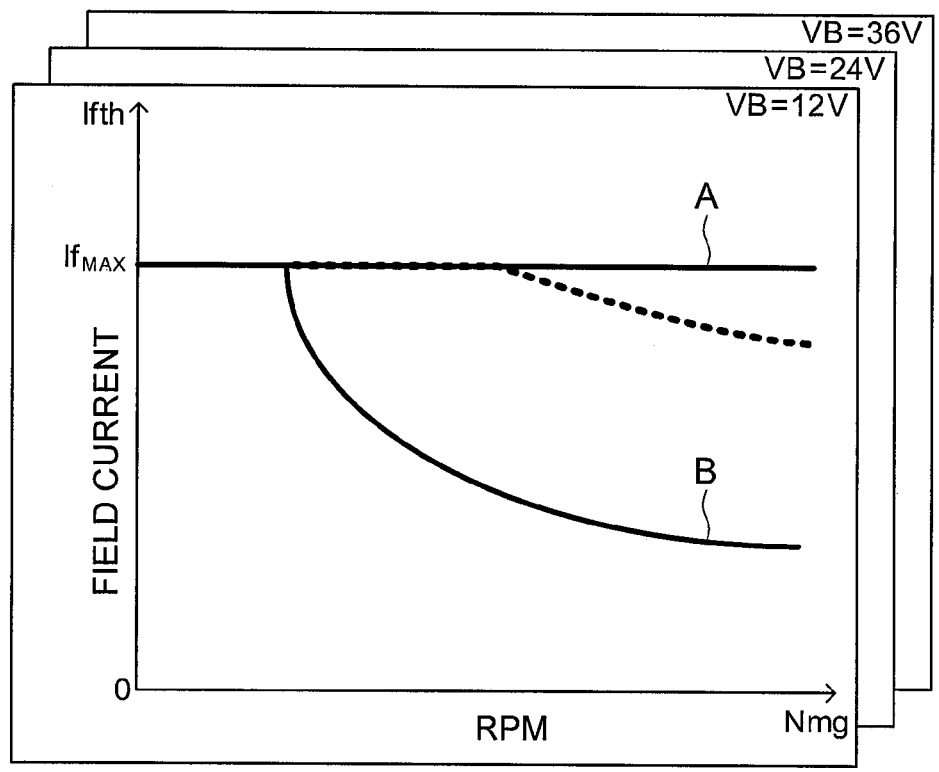
FIG. 4 is a graph showing a field current level Ifth used for determining reduction operation completion according to the second embodiment of the present invention.

Next, in Step S12, a field current level Ifth used for determining reduction operation completion is calculated. As shown in FIG. 4, the field current level Ifth uses a value determined based on the next operating mode command, the B-terminal voltage or battery voltage, and the rpm.

For example, FIG. 4 shows an rpm Nmg of the generator-motor and the field current level Ifth (threshold) for an operating mode to be shifted. Symbol A represents the field current level Ifth in the case where the next operating mode is the power generating mode, and symbol B represents the field current level Ifth in the case where the next operating mode is a mode other than the power generating mode. The field current level Ifth in the power generating mode is set to be higher than the field current level Ifth in a mode other than the power generating mode, such as the stop mode. Such relationship is set for each battery voltage (VB=12 V, 24 V, and 36 V). Similarly, the field current level Ifth may be set for each detected B-terminal voltage, or may be defined as a formula. Such information (information used for determining reduction operation completion) can be stored, for example, in the storage portion 132 in advance for use.

In particular, the field current level Ifth (threshold) is set so that, when the operating mode to which the rotating electrical machine shifts next is the power generating mode, the generated current immediately after the mode shift may be equal to or smaller than a predetermined value.

When the next operating mode command (mode to be shifted) is the power generating mode, the field current level Ifth (threshold) used for determining reduction operation completion is set around a maximum field current $If_{MAX}$ for power generation, thereby enabling the shift from the driving mode to the power generating mode as early as possible.

Note that, when the operating mode shifts from the driving mode to the power generating mode in the state in which the rpm is high and a large field current flows, an excess generated current may be generated immediately after the shift, with the result that an overvoltage may be generated in some cases. In such case, as indicated by the broken line of FIG. 4, the value of the field current level Ifth is determined in the range where the generated current may be prevented from exceeding a given value.

On the other hand, when the next operating mode command is for the stop mode, as disclosed in the invention of Patent Literature 1, the rpm of the generator-motor and the B-terminal voltage or battery voltage are used to set the field current level Ifth (threshold) in the range where the induced voltage may fall below the B-terminal voltage or the battery voltage, to thereby prevent an unintended power generation.

Note that, when a typical 12-V lead acid battery is used, a variation width of the B-terminal voltage is small and less affects the field current level Ifth, and hence the variation width may be regarded as constant. Specifically, without being detected from the input/output terminal, the standardized battery voltage stored in the storage portion 132 or the like in advance or the information for each standardized battery voltage (see FIG. 4) is used.

After the field current level used for determining reduction operation completion is determined, in Step S13, it is determined whether or not the value of the field current is equal to or smaller than the field current level Ifth (threshold) used for determining reduction operation completion. When the value of the field current is equal to or smaller than the field current level used for determining reduction operation completion, an unintended power generation can be prevented even if the energization to the armature side is stopped at this timing. Accordingly, the flow proceeds to Step S14 to stop the driving operation on the armature side, to thereby finish the driving operation.

On the other hand, when the value of the field current exceeds the field current level used for determining reduction operation completion, the flow proceeds to Step S15. If the driving operation on the armature side is stopped at this time point, electric power may be generated even with no power generation instruction. To deal with this, in Step S15, armature energization control in the driving mode is continued. After that, the flow proceeds to Step S11, and a series of the flow (Steps S13→S15→S11→S12→S13) is repeated. The driving is stopped after the field current decreases to be equal to or smaller than the field current level used for determining reduction operation completion.

Note that, Steps S11 to S15 serve as the driving stop portion 136. The field current level Ifth (threshold) used for determining reduction operation completion may be determined by calculation as described above, or alternatively, information used for determining reduction operation completion (field current level information) as shown in FIG. 4 may be stored in the storage portion 132 in advance in the form of a formula or a table for use.

In this embodiment, the threshold of the field current at which the energization to the armature side is stopped in the case of the shift from the driving mode to another operating mode (next mode) other than the driving mode is changed depending on the next operating mode. For example, in the case of the shift from the driving mode to the power generating mode, the energization to the armature side is stopped when the field current decreases to 10 A. In the case of the shift from the driving mode to the stop mode, the energization to the armature side is stopped when the field current decreases to 0.5 A.

Further, the threshold is changed depending on the next mode information, the rpm, and the B-terminal voltage or battery voltage. For example, in the case of the shift from the driving mode to the power generating mode, the energization to the armature side is stopped when the field current decreases to 10 A if the rpm is 1,000 r/min and the voltage is VB=12 V, and the energization to the armature side is stopped when the field current decreases to 6 A if the rpm is 2,000 r/min and the voltage is VB=18 V.

As described above, according to this embodiment, in the case of finishing the driving, the field current reduction operation is performed, and the field current level used for determining completion of the reduction operation is calculated or searched for by the storage portion based on the next operating mode command, the B-terminal voltage, and the rpm. Consequently, a power generating operation can be performed promptly when the next operating mode command is for power generation, and further, an unintended power generation can be prevented when the next operating mode command is for an operating mode other than the power generating mode.

Note that, also in this embodiment, the field current level (threshold) is used for a determination as to whether or not to stop the driving. Alternatively, however, the determination may be performed by using a predetermined elapsed period in each mode corresponding to the period necessary for the field current to reach the above-mentioned field current level since the field current reduction control was started (that is, since the next mode command was received). Also in this case, for example, the elapsed period determined for each operating mode to be shifted, each rpm of the generator-motor 1, and each B-terminal voltage or battery voltage may be stored in the storage portion 132 in advance in the form of a formula or a table as information used for determining reduction operation completion (elapsed period information), which may be used for the determination.

Then, the field current level Ifth (threshold) may be set based on the operating mode to be shifted next and the rpm of the generator-motor, or may be set based further on the B-terminal voltage or the battery voltage.

Third Embodiment

A third embodiment of the present invention is modified from the second embodiment by changing the method of calculating the field current level used for determining reduction operation completion. The other parts are the same as those in the second embodiment and hence only a part unique to the third embodiment is described below.

Power generation torque control has hitherto been proposed, in which a corresponding field current command is determined based on a power generation torque command value instructed from a host computer, the rpm, or the like, and the field current is controlled in accordance with the determined field current command value to generate a desired torque (for example, Patent Literature 3).

Figure 5:
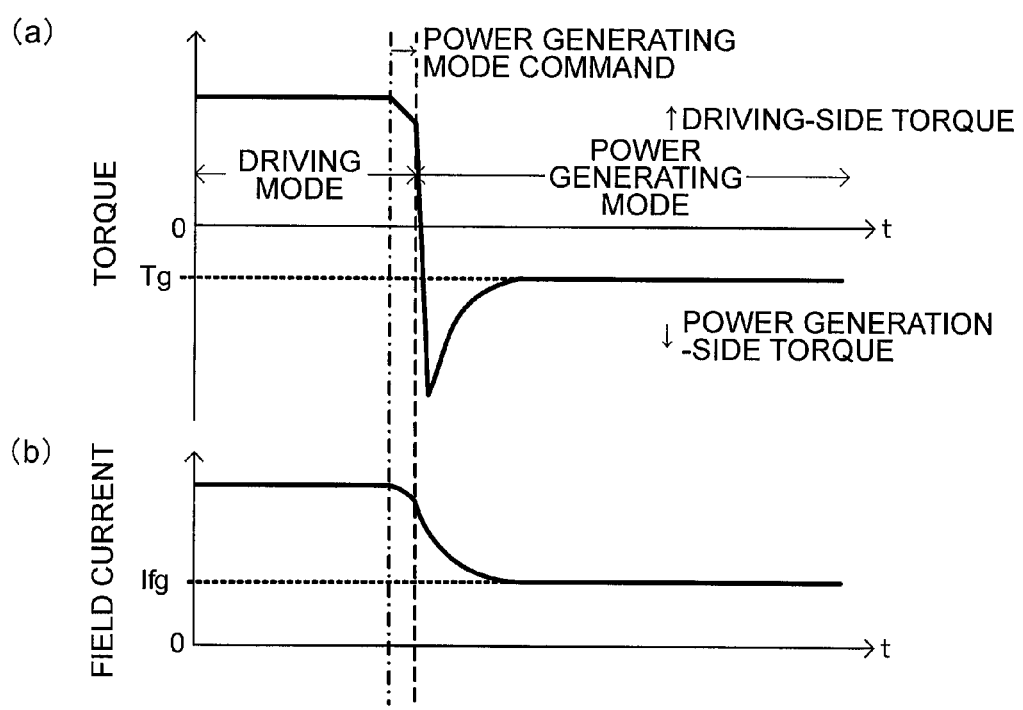
FIG. 5 is a graph showing a reduction operation according to the second embodiment of the present invention.

FIG. 5 shows an example of the relationship between the torque and the field current when the control as described in the second embodiment is performed in a generator-motor having such power generation torque control function. In FIG. 5, part (a) shows a change with time of the torque and part (b) shows a change with time of the field current. For example, as shown in FIG. 5, when a power generation torque command Tg is minute and a field current at the time of driving is large, the operating mode is shifted immediately from the driving mode to the power generating mode with the field current remaining large. Thus, electric power is generated in the state in which the field current is close to a maximum field current for power generation, with the result that a power generation torque more than necessary is generated.

Figure 6:
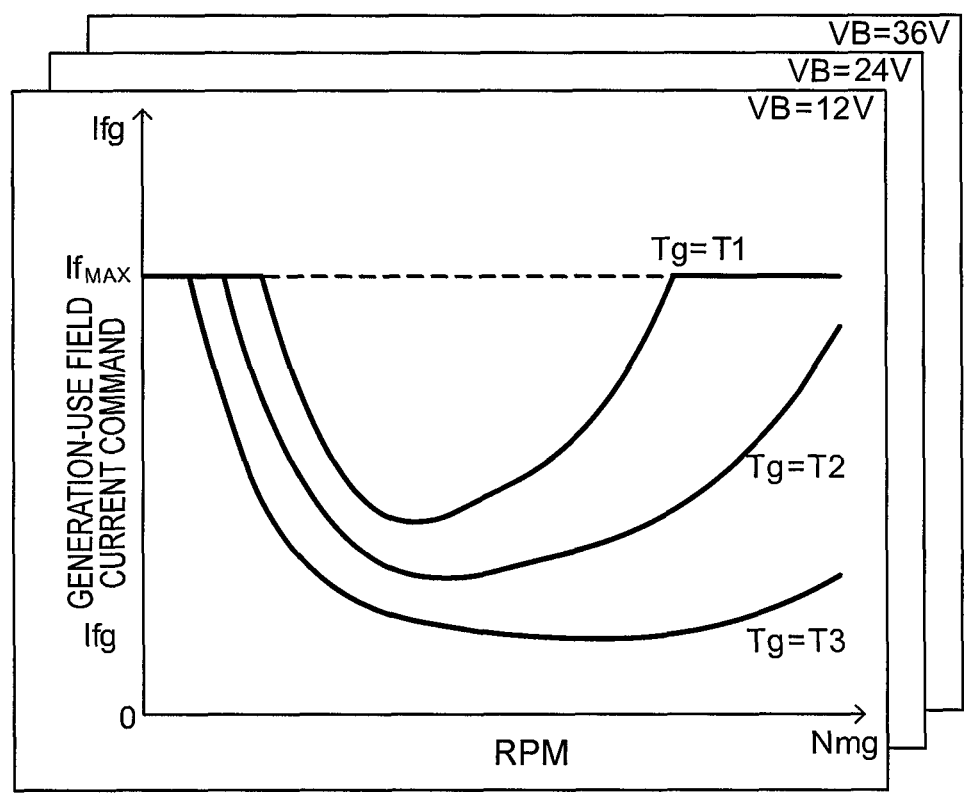
FIG. 6 is a graph showing a generation-use field current command Ifg according to a third embodiment of the present invention.

To deal with this, in this embodiment, in order to prevent the generation of torque more than necessary as described above, a field current command Ifg for power generation torque control, which is calculated based on the power generation torque command, the rpm, and the B-terminal voltage or the battery voltage, is used as the field current level Ifth used for determining reduction operation completion as shown in FIG. 6. The power generation torque command is included in the operating command OC.

In this embodiment, in the case of the shift from the driving mode to the power generating mode, the driving mode is switched to the power generating mode after the generated torque decreases to a torque command in the power generating mode.

For example, FIG. 6 shows an rpm Nmg of the generator-motor and a generation-use field current command Ifg in response to the torque command Tg=T1, T2, T3 (T1≥T2≥T3) for power generation. Then, such relationship is set for each B-terminal voltage or each battery voltage (VB=12 V, 24 V, 36 V). Then, such information used for determining reduction operation completion (field current level information) may be stored, for example, in the storage portion 132 in advance in the form of a formula or a table for use.

Figure 7:
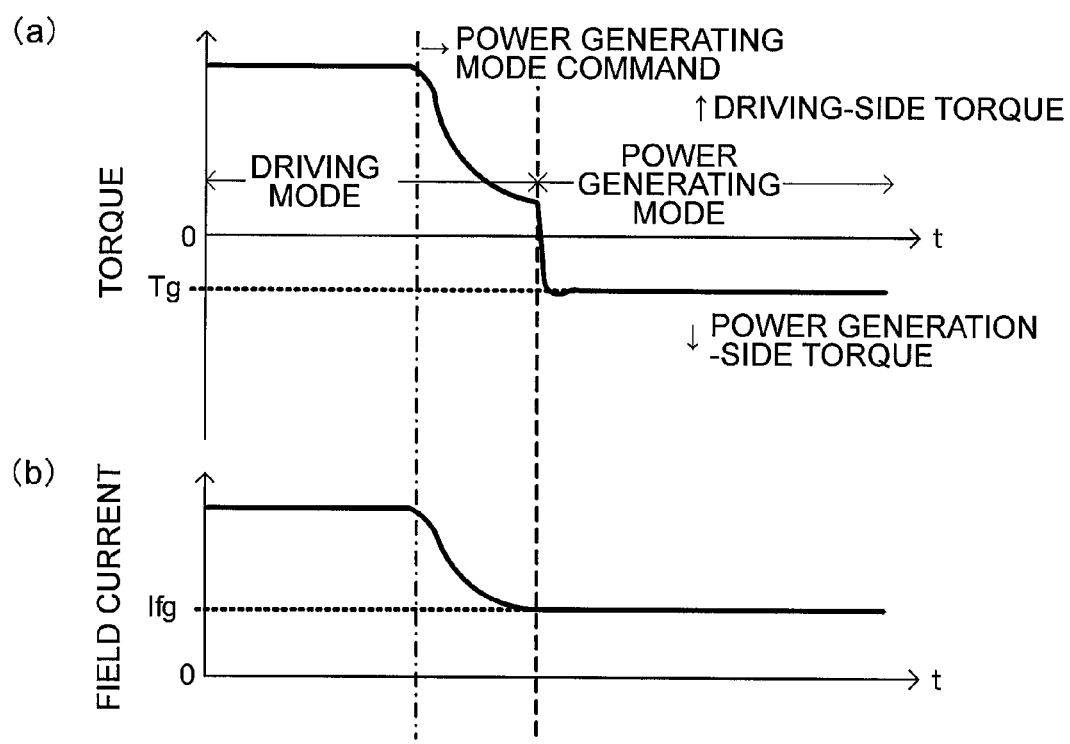
FIG. 7 is a graph showing a reduction operation according to the third embodiment of the present invention.

In this way, as shown in FIG. 7, the generation of power generation torque more than necessary for the shift from the driving mode to the power generating mode can be prevented. Parts (a) and (b) of FIG. 7 show respective changes with time of the torque and the field current corresponding to parts (a) and (b) of FIG. 5, respectively.

Note that, the above-mentioned processing is carried out by the power generation torque control portion 137 of FIG. 8. An external operating command includes a power generation torque command, and the power generation torque control portion 137 controls generated electric power so that the torque generated by the rotating electrical machine 20 during power generation may match with the power generation torque command supplied from the outside. Then, when the operating mode to which the rotating electrical machine 20 shifts next is the power generating mode, the threshold of the field current is set in accordance with the power generation torque command value.

As described above, according to this embodiment, in the case of finishing the driving mode to be shifted to the power generating mode, the reduction operation is performed, and the field current level used for determining completion of the reduction operation is calculated based on the B-terminal voltage, the rpm, and the torque command for power generation. Consequently, a power generating operation can be performed promptly when the next operating mode command is for power generation, and further, the generation of power generation torque more than necessary can be prevented.

Note that, what has been described in this embodiment is the method of preventing the generation of power generation torque more than necessary in the case where an external torque command is received to control the power generation torque. However, even in generated voltage control or the like, the above-mentioned operation may be performed in order to prevent an abrupt change in torque based on a torque limiting value stored in advance in the storage portion 132 of the control section 13. In this case, "power generation torque command" in this embodiment can be directly replaced with "power generation torque limiting value".

Specifically, in this case, the external operating command includes the power generation torque limiting value instead of the power generation torque command, and the power generation torque control portion 137 controls generated electric power so that the torque generated by the rotating electrical machine 20 during power generation may be equal to or smaller than the power generation torque limiting value. Then, when the operating mode to which the rotating electrical machine 20 shifts next is the power generating mode, the threshold of the field current is set in accordance with the power generation torque limiting value.

The use of the power generation torque command assumes that an operation is performed with a predefined torque, but the use of the power generation torque limiting value leads to operation control in which the maximum torque is limited while the voltage is basically controlled.

It is to be understood that the present invention is not limited to the above-mentioned embodiments but encompasses all possible combinations of the embodiments.

INDUSTRIAL APPLICABILITY

The power converter for a vehicle generator-motor and the method for controlling a vehicle generator-motor according to the present invention are applicable to vehicle generator-motors in various fields and provide the same effects.

REFERENCE SIGNS LIST 1 generator-motor, 2 battery (capacitor), 3 engine, 4 power transmission part, 10 power converter, 11 field power conversion section, 12 armature power conversion section, 13 control section, 14 current sensor, 20 rotating electrical machine, 21 field winding, 22 armature winding, 23 position sensor, 131 timer, 132 storage portion, 133 first driving stop portion, 134 second driving stop portion, 135 switching portion, 136 driving stop portion, 137 power generation torque control portion, B, E input/output terminal

The invention claimed is:

1. A power converter for a vehicle generator-motor, the power converter being configured to be connected to a rotating electrical machine including a field winding and an armature winding to perform control in accordance with an operation command issued from an outside, the power converter comprising:
a field power conversion section connected between the field winding and an input/output terminal for electric power, for controlling a field current flowing through the field winding;
an armature power conversion section connected between the armature winding and the input/output terminal, for performing AC-DC interconversion; and
a control section for controlling the field power conversion section and the armature power conversion section in accordance with an operating mode of the rotating electrical machine based on the operation command,
wherein the control section switches the operating mode among a plurality of operating modes including a driving mode and at least one of a power generating mode or a braking mode,
the driving mode being configured to convert DC power supplied from the input/output terminal into AC power to generate driving torque in the rotating electrical machine,
the power generating mode being configured to convert the AC power generated by the rotating electrical machine into DC power and supplying the DC power to an external load connected to the input/output terminal,
the braking mode being configured to generate braking torque by consuming the AC power generated by the rotating electrical machine inside the rotating electrical machine and inside the power converter,
wherein, in a case of shift from the driving mode to another mode, a timing to stop energization of an armature current of the armature winding is changed in accordance with a type of a mode to be shifted next, and
wherein the control section comprises:
first driving stop portion for controlling the armature power conversion section to immediately stop the energization of the armature current when the operation of the rotating electrical machine is shifted from the driving mode to another operating mode;
second driving stop portion for controlling the field power conversion section to start processing of reducing the field current and thereafter controlling the armature power conversion section to stop the energization of the armature current when the field current becomes equal to or smaller than a predetermined threshold; and
switching portion for switching between the first driving stop portion and the second driving stop portion so that the first driving stop portion is used in a case of shift from the driving mode to one of the power generating mode and the braking mode and that the second driving stop portion is used in a case of shift from the driving mode to a mode other than the power generating mode and the braking mode.

2. The power converter for a vehicle generator-motor according to claim 1, wherein, instead of using the predetermined threshold for the field current, a predetermined elapsed period in each mode corresponding to a period necessary for the field current to be equal to or smaller than the predetermined threshold.

3. A power converter for a vehicle generator-motor, the power converter being configured to be connected to a rotating electrical machine including a field winding and an armature winding to perform control in accordance with an operation command issued from an outside, the power converter comprising:
a field power conversion section connected between the field winding and an input/output terminal for electric power, for controlling a field current flowing through the field winding;
an armature power conversion section connected between the armature winding and the input/output terminal, for performing AC-DC interconversion; and
a control section for controlling the field power conversion section and the armature power conversion section in accordance with an operating mode of the rotating electrical machine based on the operation command,
wherein the control section switches the operating mode among a plurality of operating modes including a driving mode and at least one of a power generating mode or a braking mode,
the driving mode being configured to convert DC power supplied from the input/output terminal into AC power to generate driving torque in the rotating electrical machine,
the power generating mode being configured to convert the AC power generated by the rotating electrical machine into DC power and supplying the DC power to an external load connected to the input/output terminal,
the braking mode being configured to generate braking torque by consuming the AC power generated by the rotating electrical machine inside the rotating electrical machine and inside the power converter,
wherein, in a case of shift from the driving mode to another mode, a timing to stop energization of an armature current of the armature winding is changed in accordance with a type of a mode to be shifted next, and
wherein the control section comprises driving stop portion for controlling, when the operation of the rotating electrical machine is shifted from the driving mode to another operating mode, the field power conversion section to start processing of reducing the field current and thereafter controlling the armature power conversion section to stop the energization of the armature current when the field current becomes equal to or smaller than a predetermined threshold that is set for each mode depending on an operation mode to be shifted.

4. The power converter for a vehicle generator-motor according to claim 3, wherein the predetermined threshold of the field current in the case of shift to the power generating mode is larger than the predetermined threshold of the field current in the case of the shift to another operating mode.

5. The power converter for a vehicle generator-motor according to claim 4, wherein the predetermined threshold of the field current is set in accordance with an operating mode to which the rotating electrical machine shifts next and an rpm of the rotating electrical machine.

6. The power converter for a vehicle generator-motor according to claim 4, wherein the predetermined threshold of the field current is set in accordance with an operating mode to which the rotating electrical machine shifts next, an rpm of the rotating electrical machine, and a voltage of the input/output terminal.

7. The power converter for a vehicle generator-motor according to claim 4, wherein, when an operating mode to which the rotating electrical machine shifts next is the power generating mode, the predetermined threshold of the field current is set so that a generated current immediately after the mode shift becomes equal to or smaller than a predetermined value.

8. The power converter for a vehicle generator-motor according to claim 4,
wherein the operation command issued from the outside comprises a power generation torque command,
wherein the control section comprises power generation torque control portion for controlling generated electric power so that torque generated by the rotating electrical machine during power generation matches with the power generation torque command, and
wherein, when an operating mode to which the rotating electrical machine shifts next is the power generating mode, the predetermined threshold of the field current is set in accordance with a value of the power generation torque command.

9. The power converter for a vehicle generator-motor according to claim 4,
wherein the operation command issued from the outside comprises a power generation torque limiting value,
wherein the control section comprises power generation torque limiting portion for controlling generated electric power so that torque generated by the rotating electrical machine during power generation becomes equal to or smaller than the power generation torque limiting value; and
wherein, when an operating mode to which the rotating electrical machine shifts next is the power generating mode, the predetermined threshold of the field current is set in accordance with the power generation torque limiting value.

10. The power converter for a vehicle generator-motor according to claim 4, wherein, instead of using the predetermined threshold for the field current, a predetermined elapsed period in each mode corresponding to a period necessary for the field current to be equal to or smaller than the predetermined threshold.

11. The power converter for a vehicle generator-motor according to claim 3,
wherein the predetermined threshold of the field current is set in accordance with an operating mode to which the rotating electrical machine shifts next and an rpm of the rotating electrical machine.

12. The power converter for a vehicle generator-motor according to claim 3, wherein the predetermined threshold of the field current is set in accordance with an operating mode to which the rotating electrical machine shifts next, an rpm of the rotating electrical machine, and a voltage of the input/output terminal.

13. The power converter for a vehicle generator-motor according to claim 3, wherein, when an operating mode to which the rotating electrical machine shifts next is the power generating mode, the predetermined threshold of the field current is set so that a generated current immediately after the mode shift becomes equal to or smaller than a predetermined value.

14. The power converter for a vehicle generator-motor according to claim 3,
wherein the operation command issued from the outside comprises a power generation torque command,
wherein the control section comprises power generation torque control portion for controlling generated electric power so that torque generated by the rotating electrical machine during power generation matches with the power generation torque command, and
wherein, when an operating mode to which the rotating electrical machine shifts next is the power generating mode, the predetermined threshold of the field current is set in accordance with a value of the power generation torque command.

15. The power converter for a vehicle generator-motor according to claim 3,
wherein the operation command issued from the outside comprises a power generation torque limiting value,
wherein the control section comprises power generation torque limiting portion for controlling generated electric power so that torque generated by the rotating electrical machine during power generation becomes equal to or smaller than the power generation torque limiting value; and
wherein, when an operating mode to which the rotating electrical machine shifts next is the power generating mode, the predetermined threshold of the field current is set in accordance with the power generation torque limiting value.

16. The power converter for a vehicle generator-motor according to claim 3, wherein, instead of using the predetermined threshold for the field current, a predetermined elapsed period in each mode corresponding to a period necessary for the field current to be equal to or smaller than the predetermined threshold.

17. A method for controlling a vehicle generator-motor, the vehicle generator-motor comprising a power converter configured to be connected to a rotating electrical machine including a field winding and an armature winding to perform control in accordance with an operation command issued from an outside,
the method comprising:
controlling, by a field power conversion section connected between the field winding and an input/output terminal for electric power, a field current flowing through the field winding;
performing, by an armature power conversion section connected between the armature winding and the input/output terminal, AC-DC interconversion;
controlling, by a control section, the field power conversion section and the armature power conversion section in accordance with an operating mode of the rotating electrical machine based on the operation command;
switching the operating mode among operating modes including a driving mode and at least one of a power generating mode or a braking mode, the driving mode being configured to convert DC power supplied from the input/output terminal into AC power to generate driving torque in the rotating electrical machine, the power generating mode being configured to convert the AC power generated by the rotating electrical machine into DC power and supplying the DC power to an external load connected to the input/output terminal, the braking mode being configured to generate braking torque by consuming the AC power generated by the rotating electrical machine inside the rotating electrical machine and inside the power converter; and changing, in a case of shift from the driving mode to another mode, a timing to stop energization of an armature current of the armature winding in accordance with a type of a mode to be shifted next, wherein the control section comprises driving stop portion for controlling, when the operating mode of the rotating electrical machine is shifted from the driving mode to another operating mode, the field power conversion section to start processing of reducing the field current and thereafter controlling the armature power conversion section to stop the energization of the armature current when the field current becomes equal to or smaller than a predetermined threshold that is set for each mode depending on an operation mode to be shifted.

* * * * *